United States Patent
Harada et al.

(10) Patent No.: US 11,098,211 B2
(45) Date of Patent: Aug. 24, 2021

(54) PHOTOCURABLE INKJET PRIMER INK COMPOSITION, INKJET INK SET AND INKJET RECORDING METHOD

(71) Applicant: Maxell Holdings, Ltd., Kyoto (JP)

(72) Inventors: Yujiro Harada, Osaka (JP); Tomohisa Nishimoto, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 344 days.

(21) Appl. No.: 16/305,320

(22) PCT Filed: Mar. 14, 2017

(86) PCT No.: PCT/JP2017/010168
§ 371 (c)(1),
(2) Date: Nov. 28, 2018

(87) PCT Pub. No.: WO2017/208562
PCT Pub. Date: Dec. 7, 2017

(65) Prior Publication Data
US 2020/0317940 A1    Oct. 8, 2020

(30) Foreign Application Priority Data
May 31, 2016   (JP) .............................. JP2016-108911

(51) Int. Cl.
| | | |
|---|---|---|
| *C09D 11/107* | (2014.01) | |
| *B41M 5/00* | (2006.01) | |
| *B41M 7/00* | (2006.01) | |
| *C09D 11/101* | (2014.01) | |
| *C09D 11/38* | (2014.01) | |
| *C09D 11/54* | (2014.01) | |

(52) U.S. Cl.
CPC ......... *C09D 11/107* (2013.01); *B41M 5/0023* (2013.01); *B41M 7/0081* (2013.01); *C09D 11/101* (2013.01); *C09D 11/38* (2013.01); *C09D 11/54* (2013.01)

(58) Field of Classification Search
CPC . B41M 5/0023; B41M 7/0081; C09D 11/101; C09D 11/38; C09D 11/54; C09D 11/107
See application file for complete search history.

(56) References Cited

U.S. PATENT DOCUMENTS 9,034,939 B2    5/2015   Kito et al.

FOREIGN PATENT DOCUMENTS

| JP | 2010-228115 A | 10/2010 |
|---|---|---|
| JP | 2011-177964 A | 9/2011 |
| JP | 2012-140615 A | 7/2012 |
| WO | 2012/081703 A1 | 6/2012 |
| WO | 2016/104423 A1 | 6/2016 |

OTHER PUBLICATIONS

International Search Report issued in corresponding International Patent Application No. PCT/JP2017/010168, dated Apr. 25, 2017, with English Translation.
English Translation of the International Preliminary Report on Patentability, dated Dec. 4, 2018 and English Translation of the Written Opinion of the International Searching Authority for PCT/JP2017/010168, dated Apr. 25, 2017.

*Primary Examiner* — Lamson D Nguyen
(74) *Attorney, Agent, or Firm* — McDermott Will & Emery LLP

(57) ABSTRACT

To provide a photocurable inkjet primer ink composition having a low viscosity, which is capable of forming a primer layer which exhibits excellent adhesion to a non-absorptive substrate material and has low tackiness, an inkjet ink set, and an inkjet recording method. A photocurable inkjet primer ink composition comprising: a photopolymerizable compound and a photopolymerization initiator, the composition having a viscosity at 25° C. of 5.0 to 10.0 mPa·s; wherein the photopolymerizable compound is composed of a monofunctional ethylenically unsaturated monomer and a bifunctional ethylenically unsaturated oligomer; wherein a content of the monofunctional ethylenically unsaturated monomer is 76.0 parts by weight or more per 100 parts by weight of the whole composition; and wherein a homopolymer of the monofunctional ethylenically unsaturated monomer has a glass transition temperature of lower than 25° C.

6 Claims, No Drawings

PHOTOCURABLE INKJET PRIMER INK COMPOSITION, INKJET INK SET AND INKJET RECORDING METHOD

CROSS REFERENCE

This application is the U.S. National Phase under 35 U.S.C. § 371 of International Application No. PCT/JP2017/010168, filed on Mar. 14, 2017, which claims the benefit of Japanese Application No. 2016-108911, filed on May 31, 2016, the entire contents of each are hereby incorporated by reference.

TECHNICAL FIELD

This patent application claims the priority right under the Paris Convention from Japanese Patent Application No. 2016-108911, which is hereby incorporated by reference in its entirety.

The present invention relates to a photocurable inkjet primer ink composition, an inkjet ink set comprising the photocurable inkjet primer ink, and an inkjet recording method using the ink set.

BACKGROUND ART

An inkjet method is one of methods for recording images, letters, patterns, and the like (hereinafter collectively referred to as images) on a recording medium using an ink composition. In the inkjet method, droplets of the ink composition are discharged in a noncontact manner only to a portion on the recording medium where an image is formed.
Accordingly, it is possible to form an image efficiently and inexpensively. It is also studied to form an image on not only an absorptive substrate material such as paper and cloth but also on a non-absorptive substrate material such as a resin film, glass, a plastic, a metal, and the like.

As a recording method using the inkjet method, there is a recording method using an ink composition which is cured by irradiation with ultraviolet rays and the like (hereinafter referred to as a photocurable inkjet ink composition). The photocurable inkjet ink composition is superior in drying properties to an aqueous ink composition using water as a solvent and a solvent-type ink composition using an organic solvent as a solvent. Accordingly, the formed image is hard to be blurred. In addition, in the photocurable inkjet ink composition, a photopolymerizable compound contained in the ink composition is polymerized by irradiation with ultraviolet rays and the like to form a crosslinked structure. Accordingly, the formed image is excellent in solvent resistance, scratch resistance and weather resistance. Further, since the photocurable inkjet ink composition does not contain volatile components, the load on the environment is small.

In general, however, an image formed on a non-absorptive substrate material using an ink composition is inferior to an image formed on an absorptive substrate material in adhesion to the substrate material. Accordingly, when an image is recorded on a non-absorptive substrate material using an ink composition, a method which comprises applying a primer ink composition to the non-absorptive substrate material before forming an image such that a primer layer is formed has been used. For example, Patent Document 1 discloses an inkjet primer ink composition which has a high viscosity (viscosity at 25° C. of 20.0 to 50.0 mPa·s) and contains at least one compound selected from the group consisting of an N-vinyl lactam compound, an acrylamide-based compound and an N-vinyl amide compound as an adhesion promoting component, and 2-hydroxy-3-phenoxypropyl acrylate as a polymerizable compound, in order to improve image adhesion and drawing properties.

PRIOR ART DOCUMENT

Patent Document

Patent Document 1: JP-A-2012-140615

SUMMARY OF THE INVENTION

Problems to be Solved by the Invention

In general, in order to improve the discharge stability of the ink composition, it is necessary for an inkjet head to use an ink composition having a viscosity range suitable for each inkjet head. Conventionally, an inkjet primer ink composition having a high viscosity (viscosity at 25° C. of 20.0 to 50.0 mPa·s) is known (see, for example, Patent Document 1). On the other hand, depending on the specification of the inkjet head, it is required to use an inkjet primer ink composition having a low viscosity (viscosity at 25° C. of 5.0 to 10.0 mPa·s).

Usually, an inkjet ink composition contains various materials in order to improve discharge stability and image characteristics such as film durability. As a result, the viscosity of the inkjet ink composition has been high. In other words, a photocurable inkjet primer ink composition having a high viscosity has been imparted with desired properties by inclusion of various materials. On the other hand, the photocurable inkjet primer ink composition having a low viscosity has been required to maintain the low viscosity, so that materials that can be used have been limited.

Then, in order to lower the viscosity of the photocurable inkjet primer ink composition, when the primer ink composition has been added with a photopolymerizable compound having a low viscosity, it has been found that tackiness (stickiness) of the primer layer formed have become large. In addition, it has also been found that adhesion of the formed primer layer to a non-absorptive substrate material has been lowered by the photocurable inkjet primer ink composition having a low viscosity.

The present invention has been made in view of the above-described circumstances, and it is an object of the present invention to provide a photocurable inkjet primer ink composition having a low viscosity, which is capable of forming a primer layer which exhibits excellent adhesion to a non-absorptive substrate material and has low tackiness, an inkjet ink set, and an inkjet recording method.

Solutions to the Problems

The present inventors have conducted various studies on the tackiness of the primer layer and have found that when an image is formed on a primer layer having high tackiness, the tackiness of the image becomes also high. That is, in order to improve the tackiness of an image, it has been necessary to improve the tackiness of a primer layer.

As a result of extensive studies on the above-mentioned problems, it has been found that when a photopolymerizable compound is composed of a specified monofunctional ethylenically unsaturated monomer and a bifunctional ethylenically unsaturated oligomer, and the content of the monofunctional ethylenically unsaturated monomer is equal to or more than a specified quantity, a photocurable inkjet primer ink composition having a low viscosity which is capable of forming a primer layer which has low tackiness and is excellent in adhesion to a non-absorptive substrate material can be obtained.

The present invention has been made based on the above findings, and the gist of the present invention is as follows.

[1] A photocurable inkjet primer ink composition comprising:
a photopolymerizable compound; and
a photopolymerization initiator;
the composition having a viscosity at 25° C. of 5.0 to 10.0 mPa·s;
wherein the photopolymerizable compound is composed of a monofunctional ethylenically unsaturated monomer and a bifunctional ethylenically unsaturated oligomer;
wherein a content of the monofunctional ethylenically unsaturated monomer is 76.0 parts by weight or more per 100 parts by weight of the whole composition; and
wherein a homopolymer of the monofunctional ethylenically unsaturated monomer has a glass transition temperature of lower than 25° C.

When the photopolymerizable compound is composed of the monofunctional ethylenically unsaturated monomer and the bifunctional ethylenically unsaturated oligomer, a photocurable inkjet primer ink composition having a low viscosity can be obtained. The photocurable inkjet primer ink composition is capable of forming a primer layer which is excellent in adhesion to a non-absorptive substrate material and has low tackiness.

[2] The photocurable inkjet primer ink composition according to the above [1], wherein the monofunctional ethylenically unsaturated monomer contains 50.0 to 65.0 parts by weight of benzyl (meth)acrylate, 5.0 to 15.0 parts by weight of 2-ethylhexyl (meth)acrylate, and 5.0 to 15.0 parts by weight of 2-hydroxy-3-phenoxypropyl (meth)acrylate, per 100 parts by weight of the whole composition; and
wherein the bifunctional ethylenically unsaturated oligomer contains 1.0 part by weight or more and less than 15.0 parts by weight of a bifunctional urethane (meth)acrylate oligomer, per 100 parts by weight of the whole composition.

Due to such a composition, the photocurable inkjet primer ink composition is capable of forming a primer layer which is more excellent in adhesion to a non-absorptive substrate material and has less tackiness.

[3] The photocurable inkjet primer ink composition according to the above [1] or [2], further comprising an antigelling agent.

When the photocurable inkjet primer ink composition contains an antigelling agent, storage stability of the ink composition can be improved.

[4] The photocurable inkjet primer ink composition according to any one of the above [1] to [3], further comprising a surface adjusting agent.

When the photocurable inkjet primer ink composition contains a surface adjusting agent, the wettability to the substrate material is improved, and the ink composition gets wet and spreads without causing cissing.

[5] An inkjet ink set comprising:
the photocurable inkjet primer ink composition according to any one of the above [1] to [4]; and
a photocurable inkjet color ink composition that contains a photopolymerizable compound, a photopolymerization initiator and a coloring agent.

When the inkjet ink set is used, it is possible to form an image having excellent adhesion to a non-absorptive substrate material and low tackiness on a primer layer.

[6] An inkjet recording method for forming an image on a recording medium that is composed of a non-absorptive substrate material by using the inkjet ink set according to the above [5];
the method comprising:
discharging the photocurable inkjet primer ink composition from an inkjet head and photocuring the photocurable inkjet primer ink composition;
and thereafter, discharging the photocurable inkjet color ink composition from an inkjet head and photocuring the photocurable inkjet color ink composition.

When the inkjet recording method is employed, it is possible to record an image having excellent adhesion to a non-absorptive substrate material and low tackiness on a primer layer.

Effects of the Invention

According to the present invention, it is possible to provide a photocurable inkjet primer ink composition having a low viscosity, which is capable of forming a primer layer which exhibits excellent adhesion to a non-absorptive substrate material and has low tackiness, an inkjet ink set, and an inkjet recording method.

EMBODIMENTS OF THE INVENTION

Hereinafter, an embodiment of the present invention (hereinafter also referred to as the present embodiment) is described in detail. The present invention is not limited to the following contents.

1. Photocurable Inkjet Primer Ink Composition

The photocurable inkjet primer ink composition according to the present embodiment contains: a photopolymerizable compound; and a photopolymerization initiator; the composition having a viscosity at 25° C. of 5.0 to 10.0 mPa·s; wherein the photopolymerizable compound is composed of a monofunctional ethylenically unsaturated monomer and a bifunctional ethylenically unsaturated oligomer; wherein a content of the monofunctional ethylenically unsaturated monomer is 76.0 parts by weight or more per 100 parts by weight of the whole composition; and wherein a homopolymer of the monofunctional ethylenically unsaturated monomer has a glass transition temperature of lower than 25° C.

<Monofunctional Ethylenically Unsaturated Monomer>

The monofunctional ethylenically unsaturated monomer is a photopolymerizable compound that cures the ink composition by irradiation with ultraviolet rays and the like and is necessarily contained in the photocurable inkjet primer ink composition according to the present embodiment.

The content of the monofunctional ethylenically unsaturated monomer is 76.0 parts by weight or more per 100 parts by weight of the whole composition. When the content is less than 76.0 parts by weight, adhesion of the formed primer layer to a non-absorptive substrate material tends to be decreased. The content is preferably 80.0 parts by weight or more. When two or more monofunctional ethylenically unsaturated monomers are contained, the content is determined as the sum of the content of each monofunctional ethylenically unsaturated monomer. The content is preferably 86 parts by weight or less, and is more preferably 85 parts by weight or less.

The homopolymer of the monofunctional ethylenically unsaturated monomer has a glass transition temperature of lower than 25° C. When the glass transition temperature of the homopolymer of the monofunctional ethylenically unsaturated monomer is 25° C. or higher, tackiness on the surface of the formed primer layer tends to be high. The glass transition temperature is preferably 20° C. or lower and is more preferably 10° C. or lower. The glass transition temperature is preferably −90° C. or higher and is more preferably −80° C. or higher.

Examples of the monofunctional ethylenically unsaturated monomer having the glass transition temperature of the homopolymer of lower than 25° C. include 2-ethylhexyl (meth)acrylate, isoamyl (meth)acrylate, benzyl (meth)acrylate, phenoxyethyl (meth)acrylate, 2-hydroxyethyl (meth)acrylate, 2-hydroxypropyl (meth)acrylate, 2-hydroxy-3-phenoxypropyl (meth)acrylate and the like. Each of them may be used alone, or two or more of them may be used in combination. When two or more monofunctional ethylenically unsaturated monomers are used in combination, it is preferable that the homopolymer has a glass transition temperature of lower than 25° C. for all the monofunctional ethylenically unsaturated monomers.

Among these monofunctional ethylenically unsaturated monomers, from the viewpoint of adjusting the viscosity to a low level and improving adhesion and wettability, it is preferable that the composition contains 50.0 to 65.0 parts by weight of benzyl (meth)acrylate, 5.0 to 15.0 parts by weight of 2-ethylhexyl (meth)acrylate and 5.0 to 15.0 parts by weight of 2-hydroxy-3-phenoxypropyl (meth)acrylate, per 100 parts by weight of the whole composition.

<Bifunctional Ethylenically Unsaturated Oligomer>

The bifunctional ethylenically unsaturated oligomer is a photopolymerizable compound that cures the ink composition by irradiation with ultraviolet rays and the like and is necessarily contained in the photocurable inkjet primer ink composition according to the present embodiment. When the photocurable inkjet primer ink composition does not contain the bifunctional ethylenically unsaturated oligomer, tackiness on the surface of the formed primer layer tends to be high.

Examples of the bifunctional ethylenically unsaturated oligomer include a bifunctional urethane (meth)acrylate oligomer, a bifunctional epoxy (meth)acrylate oligomer, a bifunctional polyester (meth)acrylate oligomer, a bifunctional polyether (meth)acrylate oligomer and the like. Each of them may be used alone, or two or more of them may be used in combination. Among them, the bifunctional ethylenically unsaturated oligomer is preferably a bifunctional urethane (meth)acrylate oligomer from the viewpoint of improving scratch resistance and coating properties such as stretchability.

From the viewpoint of improving scratch resistance and coating properties such as stretchability, the content of the bifunctional ethylenically unsaturated oligomer is preferably 1.0 part by weight or more and less than 15.0 parts by weight per 100 parts by weight of the whole composition. The content is more preferably 5.0 parts by weight or more, and is more preferably 10.0 parts by weight or less. When two or more bifunctional ethylenically unsaturated oligomers are contained, the content is determined as the sum of the content of each bifunctional ethylenically unsaturated oligomer.

In the present specification, an "oligomer" has a weight average molecular weight of 800 to 10,000. The weight average molecular weight means the weight average molecular weight in terms of polystyrene measured by GPC (Gel Permeation Chromatography).

In the photocurable inkjet primer ink composition according to the present embodiment, the photopolymerizable compound is composed of the monofunctional ethylenically unsaturated monomer and the bifunctional ethylenically unsaturated oligomer, and does not contain any other components.

<Photopolymerization Initiator>

The photopolymerization initiator is necessarily contained in the photocurable inkjet primer ink composition according to the present embodiment. The photopolymerization initiator is not particularly limited as long as it is a compound that promotes a radical reaction when being irradiated with light having a wavelength of an ultraviolet region, a near ultraviolet region or a visible light region.

Examples of the photopolymerization initiator include a benzoin compound having 14 to 18 carbon atoms [for example, benzoin, benzoin methyl ether, benzoin ethyl ether, benzoin propyl ether, benzoin isobutyl ether and the like], an acetophenone compound having 8 to 18 carbon atoms [for example, acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexylphenylketone, 2-methyl-1-[4-(methylthio)phenyl]-2-morpholinopropan-1-one and the like], an anthraquinone compound having 14 to 19 carbon atoms [for example, 2-ethylanthraquinone, 2-t-butylanthraquinone, 2-chloroanthraquinone, 2-amylanthraquinone and the like], a thioxanthone compound having 13 to 17 carbon atoms [for example, 2,4-diethylthioxanthone, 2-isopropylthioxanthone, 2-chlorothioxanthone and the like], a ketal compound having 16 to 17 carbon atoms [for example, acetophenone dimethyl ketal, benzyl dimethyl ketal and the like], a benzophenone compound having 13 to 21 carbon atoms [for example, benzophenone, 4-benzoyl-4'-methyldiphenyl sulfide, 4,4'-bismethylaminobenzophenone and the like], an acylphosphine oxide compound having 22 to 28 carbon atoms [for example, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)phenylphosphine oxide], a mixture of these compounds and the like. Each of them may be used alone, or two or more of them may be used in combination.

From the viewpoint of photopolymerizability, the content of the photopolymerization initiator is preferably 3 parts by weight or more, and is more preferably 5 parts by weight or more per 100 parts by weight of the whole composition. Further, the content is preferably 15 parts by weight or less, and is more preferably 13 parts by weight or less.

In the case where two or more photopolymerization initiators are contained in the composition, the content is determined as the sum of the content of each photopolymerization initiator.

<Antigelling Agent>

It is preferable that the photocurable inkjet primer ink composition according to the present embodiment further contains an antigelling agent. When the photocurable inkjet primer ink composition contains an antigelling agent, storage stability of the ink composition can be improved.

Examples of the antigelling agent include hydroquinone, benzoquinone, p-methoxyphenol, hydroquinone monomethyl ether, hydroquinone monobutyl ether, TEMPO, 4-hydroxy-TEMPO, TEMPOL, Cupferron Al, IRGASTAB UV-10, IRGASTAB UV-22, FIRSTCURE ST-1 (manufactured by Albemarle Corporation) and the like.

From the viewpoint of improving storage stability of the ink composition, the content of the antigelling agent is preferably 0.1 parts by weight or more, and is more preferably 0.2 parts by weight or more per 100 parts by weight of the whole composition. Further, the content is preferably 5.0 parts by weight or less, and is more preferably 3.0 parts by weight or less. In the case where two or more antigelling agents are contained in the composition, the content is determined as the sum of the content of each antigelling agent.

<Surface Adjusting Agent>

It is preferable that the photocurable inkjet primer ink composition according to the present embodiment further contains a surface adjusting agent. When the photocurable inkjet primer ink composition contains a surface adjusting agent, the wettability to a substrate material is improved, and the ink composition gets wet and spreads without causing cissing.

Examples of the surface adjusting agent include a silicone-based compound and the like. Examples of the silicone-based compound include a silicone-based compound having a structure of polydimethyl siloxane and the like. Specifically, examples of the silicone-based compound include polyether-modified polydimethylsiloxane, polyester-modified polydimethylsiloxane, polyaralkyl-mothfied polydimethylsiloxane and the like.

Examples thereof which may be used include, in trade names, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 (all manufactured by BYK Japan KK), TEGO-Rad2100, TEGO-Rad2200N, TEGO-Rad2250, TEGO-Rad2300, TEGO-Rad2500, TEGO-Rad2600, TEGO-Rad2700 (all manufactured by Degussa AG), GLANOL 100, GLANOL 115, GLANOL 400, GLANOL 410, GLANOL 435, GLANOL 440, GLANOL 450, B-1484, Polyflow ATF-2, KL-600, UCR-L72, UCR-L93 (all manufactured by KYOEISHA CHEMICAL Co., LTD.) and the like. Each of them may be used alone, or two or more of them may be used in combination.

From the viewpoint of improving wettability to the substrate material of the ink composition, the content of the surface adjusting agent is preferably 0.001 parts by weight or more, and is more preferably 0.05 parts by weight or more per 100 parts by weight of the whole composition. Further, the content is preferably 5.0 parts by weight or less, and is more preferably 3.0 parts by weight or less. In the case where two or more surface adjusting agents are contained in the composition, the content is determined as the sum of the content of each surface adjusting agent.

<Coloring Agent>

The photocurable inkjet primer ink composition according to the present embodiment is preferably transparent so as not to affect the image quality of an image formed on the primer layer. The primer ink composition may contain a coloring agent to the extent that it does not affect the adhesion to the image layer formed on the primer layer, but preferably does not contain a coloring agent. In addition, when the photocurable inkjet primer ink composition contains a coloring agent, the dispersibility of the ink composition may be destabilized or a metallic element contained in the coloring agent may be precipitated. For these reasons, it is preferable that the photocurable inkjet primer ink composition does not contain a coloring agent.

Examples of the coloring agent include a diarylide based coloring agent, a condensed azo based coloring agent, a quinacridone based coloring agent, a vat based coloring agent, an isoindolinone based coloring agent, a phthalocyanine based coloring agent, an aniline based coloring agent, titanium oxide, nickel titanium, yellow iron oxide, red iron oxide, ultramarine blue, cobalt blue, chromium oxide, iron black, chrome yellow, chrome orange, molybdenum red, a cadmium based coloring agent, carbon black and the like, which are conventionally known.

The photocurable inkjet primer ink composition according to the present embodiment may contain other additives, if necessary, as long as the effect of the present invention is not impaired. Examples of other additives include an antioxidant, a pigment dispersant, an ultraviolet absorber, a photostabilizer, a polymerization inhibitor, a chain transfer agent, a filler, a sensitizer and the like.

A method for producing the photocurable inkjet primer ink composition according to the present embodiment is not particularly limited, but for example, the photocurable inkjet primer ink composition can be produced by homogeneously mixing a monofunctional ethylenically unsaturated monomer, a bifunctional ethylenically unsaturated oligomer, a photopolymerization initiator, and if necessary, an antigelling agent, a surface adjusting agent and other additives by using a mixing and stirring device and the like.

From the viewpoint of improving discharging properties from an inkjet head and improving smoothness of the primer layer formed, the photocurable inkjet primer ink composition produced in this way has a viscosity at 25° C. of 5.0 to 10.0 mPa·s. Measurement of the viscosity of the ink composition can be carried out by using an R100 viscometer according to JIS Z 8803.

2. Inkjet Ink Set

The inkjet ink set according to the present embodiment contains the above-described photocurable inkjet primer ink composition and a photocurable inkjet color ink composition that contains a photopolymerizable compound, a photopolymerization initiator and a coloring agent. When the inkjet ink set is used, it is possible to form an image having excellent adhesion to a non-absorptive substrate material and low tackiness on a primer layer.

As the photocurable inkjet color ink composition, a conventionally known ink composition containing a photopolymerizable compound, a photopolymerization initiator and a coloring agent can be used.

Examples of the photopolymerizable compound include (meth)acrylates, aromatic vinyls, vinyl ethers, radical-polymerizable compounds such as a compound having an internal double bond (maleic acid and the like), cationically polymerizable compounds such as an epoxy compound, a vinyl ether compound, and an oxetane compound and the like. Examples of the chemical forms of these compounds include a monomer, a prepolymer (i.e., a dimer, a trimer and an oligomer) and a copolymer thereof, and a mixture thereof.

As the photopolymerization initiator and the coloring agent, a photopolymerization initiator and a coloring agent exemplified as those contained in the above-described photocurable inkjet primer ink composition can be appropriately selected and used.

3. Inkjet Recording Method

The inkjet recording method according to the present embodiment is to form an image on a recording medium composed of a non-absorptive substrate material by using the above-described inkjet ink set. More specifically, the above-described photocurable inkjet primer ink composition is discharged from an inkjet head and is photocured, and thereafter, the above-described photocurable inkjet color ink composition is discharged from an inkjet head and is photocured. As a result, an image having excellent adhesion to a non-absorptive substrate material and having low tackiness can be recorded on a primer layer.

Each of the photocurable inkjet primer ink composition and the photocurable inkjet color ink composition is preferably discharged from the inkjet head so that each of the film thickness of the coating film on the non-absorptive substrate material is 1 to 20 μm.

Each of the photocurable inkjet primer ink composition and the photocurable inkjet color ink composition may be photocured at the same time as the discharge or immediately after the discharge. Examples of the light to photocure include a far infrared ray, an infrared ray, a visible ray, a near ultraviolet ray, an ultraviolet ray and the like. Among them, from the viewpoints of easiness of curing operation and efficiency, the light is preferably a near ultraviolet ray or an ultraviolet ray.

Examples of the non-absorptive substrate material include a plastic film not having been subjected to a surface treatment for inkjet printing (that is, no ink absorption layer is formed), a substrate material such as paper on which a plastic film is coated, a substrate material to which a plastic film is adhered, and the like. Meanwhile, examples of the plastic include polyvinyl chloride, polyethylene terephthalate, polycarbonate, polystyrene, polyurethane, polyethylene, polypropylene, an acrylic resin and the like. In addition, for example, a non-absorptive substrate material including a metal such as aluminum, iron, gold, silver, copper, nickel, titanium, chromium, molybdenum, silicon, lead, zinc and stainless steel as well as glass and the like may be used.

Hereinafter, Examples in which the present embodiment is more specifically disclosed is described. It should be noted that the present invention is not limited to only these Examples.

EXAMPLES (Preparation of Photocurable Inkjet Primer Ink Composition)

A photopolymerizable compound, a photopolymerization initiator, a sensitizer an antigelling agent and a surface adjusting agent were uniformly mixed in the formulation shown in Table 1 by using a mixing and stirring device. Thereafter, by using a glass filter (manufactured by Kiriyama glass. CO.), the mixture was subjected to suction filtration to prepare photocurable inkjet primer ink compositions of Examples 1 to 6 and Comparative Examples 1 to 6.

TABLE 1

|  |  | Molecular weight | Glass transition Tg (° C.) | Example 1 | Example 2 | Example 3 | Example 4 | Example 5 | Example 6 | Comparative Example 1 |
|---|---|---|---|---|---|---|---|---|---|---|
| Formulation (parts by weight) |  |  |  |  |  |  |  |  |  |  |
| Photopolymerizable compound |  |  |  |  |  |  |  |  |  |  |
| Monofunctional | IBXA | 208.3 | 97 | — | — | — | — | — | — | — |
| ethylenically | BZA | 162.2 | 6 | 58.5 | 58.5 | 58.5 | 50.5 | 60.5 | 52.5 | 50.5 |
| unsaturated monomer | 2EHA | 184.3 | −70 | 8.0 | 12.0 | 12.0 | 12.0 | 6.0 | 14.0 | 12.0 |
|  | HPPA | 222.2 | 17 | 10.0 | 10.0 | 6.0 | 14.0 | 10.0 | 10.0 | 10.0 |
| Polyfunctional | HDDA | 226.3 | — | — | — | — | — | — | — | — |
| ethylenically | PE-3A | 298.0 | — | — | — | — | — | — | — | — |
| unsaturated monomer |  |  |  |  |  |  |  |  |  |  |
| Bifunctional ethylenically unsaturated oligomer | EBECRYL270 | 1500 | — | 10.0 | 6.0 | 10.0 | 10.0 | 10.0 | 10.0 | 15.0 |
| Photopolymerization | DAROCURE TPO | — | — | — | — | — | — | — | — | — |
| initiator | IRGACURE907 | — | — | 10.0 | 10.0 | 10.0 | 10.0 | 10.0 | 10.0 | 10.0 |
| Sensitizer | ITX-S | — | — | 3.0 | 3.0 | 3.0 | 3.0 | 3.0 | 3.0 | 3.0 |
| Antigelling agent | H-TEMPO | — | — | 0.5 | 0.5 | 0.5 | 0.5 | 0.5 | 0.5 | 0.5 |
| Surface adjusted agent | BYK-UV3510 | — | — | 0.01 | 0.01 | 0.01 | 0.01 | 0.01 | 0.01 | 0.01 |
| Total content of monofunctional ethylenically unsaturated monomer (parts by weight) |  |  |  | 76.5 | 80.5 | 76.5 | 76.5 | 76.5 | 76.5 | 72.5* |
| Viscosity at 25° C. (mPa · s) |  |  |  | 7.3 | 5.5 | 6.4 | 8.8 | 7.5 | 7.4 | 9.5 |

|  |  | Comparative Example 2 | Comparative Example 3 | Comparative Example 4 | Comparative Example 5 | Comparative Example 6 |
|---|---|---|---|---|---|---|
| Formulation (parts by weight) |  |  |  |  |  |  |
| Photopolymerizable compound |  |  |  |  |  |  |
| Monofunctional | IBXA | — | 44.5* | 44.5* | — | — |
| ethylenically | BZA | 44.5 | — | — | 39.5 | 39.5 |
| unsaturated monomer | 2EHA | 12.0 | 10.0 | 32.0 | 12.0 | 12.0 |
|  | HPPA | 30.0 | 35.0 | 10.0 | 20.0 | 20.0 |
| Polyfunctional | HDDA | — | — | — | 10.0 | — |
| ethylenically unsaturated monomer | PE-3A | — | — | — | — | 10.0 |
| Bifunctional ethylenically unsaturated oligomer | EBECRYL270 | —* | —* | —* | 5.0 | 5.0 |
| Photopolymerization | DAROCURE TPO | 13.0 | 10.0 | 13.0 | — | — |
| initiator | IRGACURE907 | — | — | — | 10.0 | 10.0 |
| Sensitizer | ITX-S | — | — | — | 3.0 | 3.0 |
| Antigelling agent | H-TEMPO | 0.5 | 0.5 | 0.5 | 0.5 | 0.5 |
| Surface adjusted agent | BYK-UV3510 | 0.01 | 0.01 | 0.01 | 0.01 | 0.01 |

TABLE 1-continued

| | | | | | |
|---|---|---|---|---|---|
| Total content of monofunctional ethylenically unsaturated monomer (parts by weight) | 86.5 | 89.5 | 86.5 | 71.5* | 71.5* |
| Viscosity at 25° C. (mPa · s) | 7.6 | 20.0* | 7.0 | 11.0* | 13.0* |

*indicates being out of the range defined in the present invention.

IBXA: Isobornyl acrylate [IBXA (the number of ethylenic double bond/1 molecule: 1), manufactured by OSAKA ORGANIC CHEMICAL INDUSTRY LTD.]

BZA: Benzyl acrylate [VISCOAT #160 (the number of ethylenic double bond/1 molecule: 1), manufactured by OSAKA ORGANIC CHEMICAL INDUSTRY LTD.]

2EHA: 2-Ethylhexyl acrylate [NORSOCRYL 2EHA (the number of ethylenic double bond/1 molecule: 1), manufactured by Arkema K.K.]

HPPA: 2-Hydroxy-3-phenoxypropyl acrylate [M-600A (the number of ethylenic double bond/1 molecule: 1), manufactured by KYOEISHA CHEMICAL Co., LTD.]

HDDA: 1,6-Hexanediol diacrylate [SR238 (the number of ethylenic double bond/1 molecule: 2), manufactured by Arkema K.K.]

PE-3A: Pentaerythritol triacrylate [LIGHT ACRYLATE PE-3A (the number of ethylenic double bond/1 molecule: 3), manufactured by KYOEISHA CHEMICAL Co., LTD.]

EBECRYL270: Urethane acrylate oligomer [EBECRYL270 (the number of ethylenic double bond/1 molecule: 2), manufactured by DAICEL-ALLNEX LTD.]

DAROCURE TPO: 2,4,6-Trimethylbenzoyl diphenylphosphine oxide [DAROCURE TPO, manufactured by BASF SE]

IRGACURE 907: 2-Methyl-1-[4-(methylthio)phenyl]-2-morpholinopropan-1-one [IRGACURE 907, manufactured by CIBA AG]

ITX-S: Isopropylthioxanthone [manufactured by DOUBLE BOND CHEMICAL IND., CO., LTD.]

H-TEMPO: 4-Hydroxy-2,2,6,6-tetramethylpiperidine-N-oxyl [HYDROXY-TEMPO, manufactured by Evonik Degussa Japan Co., Ltd.]

BYK-UV3510: Silicone-based compound having structure of polydimethyl siloxane [BYK-UV3510, manufactured by BYK Japan KK]

(Measurement of Viscosity)

The viscosity of each photocurable inkjet primer ink composition was measured by using an R100 viscometer (manufactured by TOKI SANGYO CO., LTD.) under the condition of 25° C. and the number of revolutions of the cone of 5 rpm. The results are shown in Table 1.

(Preparation of Primer Layer Sample)

Each photocurable inkjet primer ink composition was discharged from an inkjet head onto each substrate material (aluminum, glass, acrylic, and white PET) with a droplet size of 7 pl and a resolution of 600×600 dpi. Thereafter, ultraviolet rays were irradiated by using an ultraviolet LED (NCCU001E, manufactured by NICHIA CORPORATION) so that the total amount of irradiated light became 300 mJ/cm² to form a primer layer having a film thickness of 3 µm on each substrate material. In this way, each primer layer sample was prepared.

(Evaluation of Adhesion)

The primer surface of each primer layer sample was cross cut and a surface on the side of an adhesive layer of an adhesive sheet [Cellotape (registered trademark) (manufactured by NICHIBAN CO., LTD.)] was adhered to the primer layer sample and was peeled off.

Adhesion was evaluated according to the following criteria. The results are shown in Table 2.

○ (Excellent): No primer layer was peeled off at all.

Δ (Good): A part of the primer layer was peeled off.

x (Bad): The entire surface of the portion of the primer layer to which the adhesive sheet was adhered was peeled off.

(Evaluation of Tackiness)

Each primer layer sample in which a primer layer was formed on a white PET substrate material was used to evaluate tackiness. The tackiness was evaluated by measuring the tack force by using a probe tack testing machine (TE-6001, manufactured by TESTER SANGYO CO., LTD.). Specifically, first, a probe of φ 5.05 mm raised at a contact speed of 1.00 cm/sec is brought into contact with the surface of each primer layer affixed to the sample holding ring with a load of 20 gf. After being held for 1.00 sec, the probe descends at a peeling rate of 0.05 cm/sec. The tack force at that time was measured, and the results are shown in Table 2. Measurement was carried out with an additional weight of 180 gf and a measuring pressure of 1000 gf/cm². Here, a primer layer sample having a tack force of 0 to 10 N was judged to be acceptable, and a primer layer sample having a tack force exceeding 10 N was judged to be rejected.

(Evaluation of Smoothness)

Each primer layer sample in which a primer layer was formed on a white PET substrate material was used to evaluate smoothness.

Specifically, by using a portable contact angle measurement device (PG-X, manufactured by MATSUBO Corporation) with the drop size being set to 1.5 µL, and the contact angle at 3 seconds after dropping was measured. The results are shown in Table 2. Here, a primer layer sample having a contact angle of 0 to 10.0° was judged to be acceptable, and a primer layer sample having a contact angle exceeding 10.0° was judged to be rejected.

(Preparation of Image Sample)

By using each primer layer sample in which a primer layer was formed on a white PET substrate material, an image was formed on the primer layer using a photocurable inkjet color ink composition having the following composition such that each image sample was prepared.

Coloring material: 2.0 parts by weight of P-BFS (manufactured by Clariant)

Dispersing agent: 1.6 parts by weight of Solsperse 33000 (manufactured by The Lubrizol Corporation)

Monomers: 28.5 parts by weight of THFA (manufactured by OSAKA ORGANIC CHEMICAL INDUSTRY LTD.), 20 parts by weight of PEA (manufactured by Arkema K.K.), 28.5 parts by weight of HDDA (manufactured by Arkema K.K.), and 8 parts by weight of 2EHA (manufactured by Arkema K.K.)

Initiator: 8.99 parts by weight of DAROCURE TPO (manufactured by BASF SE), and 2.4 parts by weight of ITX-S (manufactured by DOUBLE BOND CHEMICAL IND., CO., LTD.)

Surface tension adjusting agent: 0.01 parts by weight of BYK-3510 (manufactured by BYK Japan KK)

Meanwhile, each content is a content per 100 parts by weight of the whole composition.

By using each image sample, tack force was measured in the same manner as described above. The results are shown in Table 2. Here, an image sample having a tack force of 0 to 5 N was judged to be acceptable, and an image sample having a tack force exceeding 5 N was judged to be rejected.

TABLE 2

|  |  | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Adhesion | Aluminum | ○ | ○ | ○ | Δ | Δ | Δ | x | Δ | ○ | Δ | x | x |
|  | Glass | ○ | ○ | ○ | ○ | ○ | ○ | ○ | Δ | ○ | Δ | x | x |
|  | Acrylic | ○ | ○ | ○ | ○ | ○ | ○ | ○ | Δ | ○ | Δ | x | x |
|  | White PET | ○ | ○ | ○ | ○ | ○ | ○ | ○ | Δ | ○ | Δ | x | x |
| Tack force (N) | Only primer | 4.4 | 4.8 | 2.8 | 5.6 | 4.4 | 4.0 | 2.8 | 12.0[#1] | 0.3 | 13.6[#1] | 0.2 | 0.2 |
|  | Primer + color | 2.9 | 2.2 | 2.4 | 2.8 | 2.5 | 2.2 | 1.8 | 9.0[#1] | 0.1 | 7.7[#1] | 0.4 | 0.4 |
| Smoothness |  | 7.9 | 8.1 | 7.9 | 8.0 | 8.0 | 8.1 | 9.5 | 8.7 | 12.2[#2] | 8.5 | 10.5[#2] | 10.9[#2] |

[#1] indicates that tack force does not achieve the target value in the present invention.
[#2] indicates that smoothness does not achieve the target value in the present invention.

As can be seen from the results in Table 2, each of the photocurable inkjet primer ink compositions of Examples 1 to 6 which satisfied all the requirements of the present invention was capable of forming a primer layer which was excellent in adhesion to a non-absorptive substrate material, had a low tackiness, and was excellent in smoothness. In addition, it was possible to form an image having a low tackiness on each of these primer layers.

On the other hand, in each of the photocurable inkjet primer ink compositions of Comparative Examples 1, 5 and 6, the content of the monofunctional ethylenically unsaturated monomer was less than 76.0 parts by weight per 100 parts by weight of the whole composition, and therefore, the adhesion of the formed primer layer to the non-absorptive substrate material was inferior.

In each of the photocurable inkjet primer ink compositions of Comparative Examples 2 and 4, the bifunctional ethylenically unsaturated oligomer was not contained as a photopolymerizable compound. In addition, in the photocurable inkjet primer ink composition of Comparative Example 4, the homopolymer of the monofunctional ethylenically unsaturated monomer had a glass transition temperature exceeding 25° C. Accordingly, tackiness of the formed primer layer and that of the image were inferior.

The photocurable inkjet primer ink composition of Comparative Example 3 had a viscosity exceeding 10 mPa·s, and therefore, the obtained primer layer was inferior in smoothness.

INDUSTRIAL APPLICABILITY

The photocurable inkjet primer ink composition according to the present invention, together with the photocurable inkjet color ink composition, can be suitably used as an inkjet ink set.

The invention claimed is:

1. A photocurable inkjet primer ink composition comprising:
   a photopolymerizable compound; and
   a photopolymerization initiator,
   wherein the composition having a viscosity at 25° C. of 5.0 to 10.0 mPa·s,
   wherein the photopolymerizable compound is composed of a monofunctional ethylenically unsaturated monomer and a bifunctional ethylenically unsaturated oligomer,
   wherein a content of the monofunctional ethylenically unsaturated monomer is 76.0 parts by weight or more per 100 parts by weight of the whole composition, and
   wherein the monofunctional ethylenically unsaturated monomer consists of a monofunctional ethylenically unsaturated monomer, a homopolymer of which has a glass transition temperature of lower than 25° C.

2. The photocurable inkjet primer ink composition according to claim 1, wherein the monofunctional ethylenically unsaturated monomer contains 50.0 to 65.0 parts by weight of benzyl acrylate, 5.0 to 15.0 parts by weight of 2-ethylhexyl (meth)acrylate, and 5.0 to 15.0 parts by weight of 2-hydroxy-3-phenoxypropyl (meth)acrylate, per 100 parts by weight of the whole composition; and
   wherein the bifunctional ethylenically unsaturated oligomer contains 1.0 part by weight or more and less than 15.0 parts by weight of a bifunctional urethane (meth)acrylate oligomer, per 100 parts by weight of the whole composition.

3. The photocurable inkjet primer ink composition according to claim 1, further comprising an antigelling agent.

4. The photocurable inkjet primer ink composition according to claim 1, further comprising a surface adjusting agent.

5. An inkjet ink set comprising:
   the photocurable inkjet primer ink composition according to claim 1; and
   a photocurable inkjet color ink composition that contains a photopolymerizable compound, a photopolymerization initiator and a coloring agent.

6. An inkjet recording method for forming an image on a recording medium that is composed of a non-absorptive substrate material by using the inkjet ink set according to claim 5,
   the method comprising:
      discharging the photocurable inkjet primer ink composition from an inkjet head and photocuring the photocurable inkjet primer ink composition; and thereafter, discharging the photocurable inkjet color ink composition from an inkjet head and photocuring the photocurable inkjet color ink composition.

* * * * *